United States Patent
Kientz et al.

(10) Patent No.: US 12,451,208 B2
(45) Date of Patent: Oct. 21, 2025

(54) CHARGE LOSS TRACKING THROUGH TARGETED BIT COUNT

(71) Applicant: Micron Technology, Inc., Boise, ID (US)

(72) Inventors: Steven Michael Kientz, Westminster, CO (US); Pitamber Shukla, San Jose, CA (US); Tarun Singh Yadav, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/647,731

(22) Filed: Apr. 26, 2024

(65) Prior Publication Data

US 2024/0363188 A1 Oct. 31, 2024

Related U.S. Application Data

(60) Provisional application No. 63/462,709, filed on Apr. 28, 2023.

(51) Int. Cl.
  *G11C 29/00* (2006.01)
  *G11C 29/50* (2006.01)
(52) U.S. Cl.
  CPC .............................. *G11C 29/50004* (2013.01)
(58) Field of Classification Search
  None
  See application file for complete search history.

(56) References Cited

U.S. PATENT DOCUMENTS

| | | | |
|---|---|---|---|
| 9,852,065 B1* | 12/2017 | Rajwade | G11C 16/0483 |
| 11,017,865 B2 | 5/2021 | Lee | |
| 11,158,387 B1 | 10/2021 | He et al. | |
| 11,244,740 B1* | 2/2022 | Xu | G11C 29/52 |
| 11,514,994 B1* | 11/2022 | Zuolo | G11C 29/021 |
| 2018/0293029 A1* | 10/2018 | Achtenberg | G11C 29/028 |
| 2019/0279728 A1* | 9/2019 | Kodama | G11C 29/44 |

(Continued)

FOREIGN PATENT DOCUMENTS

| | | |
|---|---|---|
| WO | 2014194141 | 12/2014 |
| WO | 2024227010 | 10/2024 |

OTHER PUBLICATIONS

"International Application Serial No. PCT US2024 026560, International Search Report mailed Aug. 22, 2024", 3 pgs.

(Continued)

*Primary Examiner* — Mujtaba M Chaudry
(74) *Attorney, Agent, or Firm* — Schwegman Lundberg & Woessner, P.A.

(57) ABSTRACT

Memory cells may store multiple bits per cell. For example, three-level cell (TLC) memory stores three bits per cell using eight voltage levels. The number of memory cells at each voltage is approximately the total number of cells divided by the number of voltage levels. The number of memory cells above a certain read voltage is the CFByte value for the read voltage. Based on a difference between the CFByte value and a target CFByte value for the read voltage, an adjustment value is determined. Characteristics of an individual memory device may be determined by finding several CFByte values for a small range of read voltages. Using the gathered CFByte values, a DAC adjustment value is determined for the individual memory device.

20 Claims, 11 Drawing Sheets

(56) References Cited

U.S. PATENT DOCUMENTS

| | | |
|---|---|---|
| 2019/0287643 A1 | 9/2019 | Kim et al. |
| 2021/0241845 A1 | 8/2021 | Li et al. |
| 2022/0165348 A1* | 5/2022 | Zuolo .................. G11C 29/028 |
| 2022/0270698 A1* | 8/2022 | Zuolo .................. G11C 16/102 |
| 2023/0120352 A1* | 4/2023 | Lien ....................... G11C 16/24 |
| | | 365/185.22 |

OTHER PUBLICATIONS

"International Application Serial No. PCT US2024 026560, Written Opinion mailed Aug. 22, 2024", 4 pgs.

* cited by examiner

700

710

| CFBYTE TARGETS | |
|---|---|
| VALLEY | TARGET |
| V0 | 99,800 |
| V1 | 98,500 |
| V2 | 95,000 |
| V3 | 87,500 |
| V4 | 75,500 |
| V5 | 58,000 |
| V6 | 33,000 |

720, 730A, 730B, 730C, 730D, 730E, 730F, 730G

740

| LINEAR APPROXIMATIONS | | |
|---|---|---|
| BEGINNING CFBYTE – TARGET VALUE | BEGINNING DAC OFFSET | SLOPE |
| -12,000 | -105 | 0.025 |
| -11,000 | -80 | 0.020 |
| -10,000 | -60 | 0.002 |
| -7,500 | -55 | 0.001 |
| -2,000 | -50 | 0.015 |
| 0 | -20 | 0.045 |

CHARGE LOSS TRACKING THROUGH TARGETED BIT COUNT

PRIORITY APPLICATION

This application claims the benefit of priority to U.S. Provisional Application Ser. No. 63/462,709, filed Apr. 28, 2023, which is incorporated herein by reference in its entirety.

TECHNICAL FIELD

The present disclosure generally relates to memory sub-systems, and more specifically, relates to error recovery in memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 7 illustrates a database schema suitable for use in charge loss tracking through targeted CFByte value.

DETAILED DESCRIPTION

Figure 1:
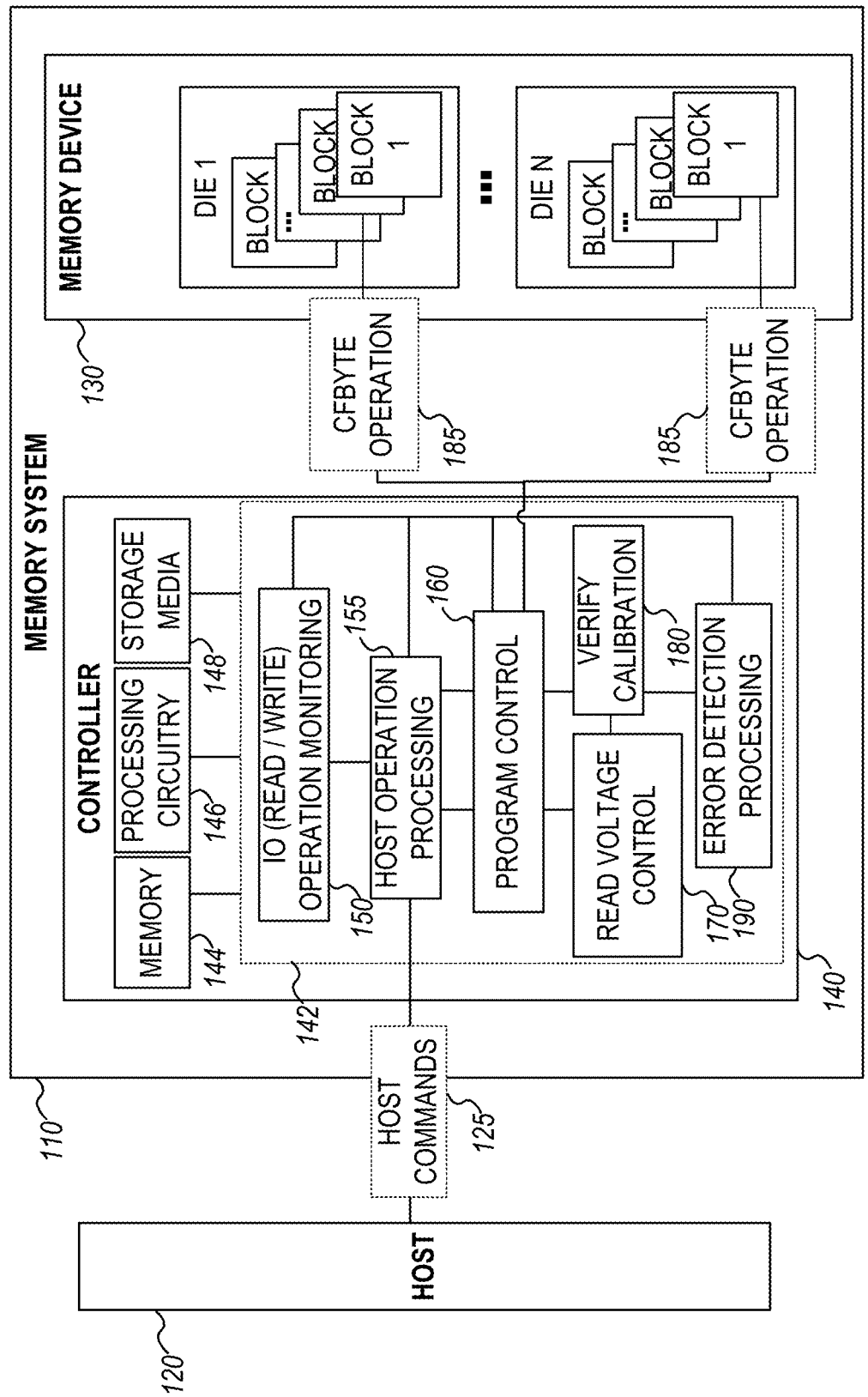
FIG. 1 illustrates an example computing environment that includes a memory sub-system in accordance with some embodiments of the present disclosure.

Aspects of the present disclosure are directed to a memory sub-system with charge loss tracking through targeted bit count. A memory sub-system is also hereinafter referred to as a "memory system." An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. Different memory components can include different types of media. Examples of media include, but are not limited to, a cross-point array of non-volatile memory and flash-based memory cells. Memory cells may store a single bit per cell or multiple bits per cell. For example, three-level cell (TLC) memory stores three bits per cell. The data may be stored by storing one of eight levels of charge in the cell.

For simplicity, one may consider reading the data in the cell by comparing the voltage of the cell to a mid-range read voltage. If the voltage of the cell is above the read voltage, the first bit of the cell is 1, otherwise it is 0. A second read voltage divides the identified (high or low) voltage range in half to determine whether the voltage of the cell is above or below the mid-point of the range. If the voltage of the cell is above the second read voltage, the second bit of the cell is 1, otherwise it is 0. The process of dividing the voltage range and comparing the value of the cell to the read voltage is repeated until all bits of the cell are read. In practice, the meaning of each of the eight levels may be modified to suit various design criteria. For example, in a typical NAND memory, a voltage below the threshold voltage is considered a 1 bit and a voltage above the threshold voltage is considered a 0 bit. As another example, multiple comparisons may be performed to determine if the cell voltage is within a range.

A scrambler may be used to change the meaning of the voltage levels for a memory cell. In an example, a memory cell having a minimum voltage value may represent a physical value of 000 while a memory cell having a maximum voltage value may represent a physical value of 111. Using the scrambler, the physical value of 000 may be converted to a different logical value (e.g., 101) and the physical value of 111 may be converted to another logical value (e.g., 010). Using the scrambler, the voltages stored in the memory cells may be roughly equally divided between all possible voltage values, even if the data being stored is not (e.g., a large number of 0 bits or American Standard Code for Information Interchange (ASCII) data is stored). Thus, the number of memory cells at each voltage is approximately the total number of cells divided by the number of voltage levels (e.g., two levels for a single-level cell, four levels for a two-bit cell, eight levels for a TLC, and so on).

Since the number of memory cells at each voltage is (approximately) known for the memory component, a read voltage calibration can be performed by adjusting the read voltage so that the expected number of memory cells is above the read voltage. A check failure bit (CFBit) count is the number of non-conduction (i.e., bit data=0 or failing bit) at a read voltage. A check failure byte (CFByte) value is the number of bytes at a read voltage that has at least one non-conducting bit (i.e., bit data=0 or failing bit).

The calibration procedure may include determining the CFByte value for a nominal read voltage and adjusting the read voltage up or down by a number of DAC adjustments (DACs) based on a difference between the CFByte value and a target CFByte value for the read voltage. A brute force solution would be to change the read voltage by a small number of DACs, determine the new CFByte value, and repeat until the target CFByte value is found (or is within a predetermined threshold from the CFByte value).

To reduce the number of reads performed in finding the adjusted read voltage, a lookup table may be used. The lookup table may store a predicted number of DACs to adjust by based on the difference between the CFByte value and the target. This allows larger adjustments to be made while the difference is large, skipping many reads that would be made using a brute force method.

The values in the lookup table may be based on averaged data gathered from a large number of memory components. However, due to variances in manufacturing and use, an individual memory component may vary from the average. Accordingly, adjusting the read voltage according to the lookup table may over- or under-shoot the voltage at which the CFByte value is sufficiently close to the target.

As disclosed herein, the characteristics of the individual memory device may be determined by making a small number of reads in a small range of read voltages. Using the gathered CFByte values, a DAC adjustment value is determined for the individual memory device. As a result, the number of reads to be performed for calibration is reduced for memory devices that vary from the average components used to create the lookup table.

Due to variances in manufacturing and degradation over time (e.g., due to program erase cycles, read-disturb effects, cross-temperature effects, and the like), the actual voltages stored in the memory cells deviate from the target voltages. As a result, the comparisons between the read voltages and the stored voltages may generate erroneous results. The life of a particular memory system may be extended by detecting the variations in the stored voltages and adjusting the read voltages to compensate.

As a result of the systems and methods disclosed herein, the number of reads used to perform a read voltage calibration is reduced, improving device performance. Additionally, the ability to perform a successful read voltage calibration is enhanced, increasing the useful lifetime of a memory device.

FIG. 1 provides a block diagram of an example system 100 including a memory system 110 (e.g., a SSD storage device, a SD/MMC card, etc.) having a memory controller 140 and a memory device 130. In an example, the functionality of control modules 142 of the memory controller 140 may be implemented in respective modules in a firmware of the memory controller 140. However, it will be understood that various forms of software, firmware, and hardware may be utilized by the controller 140 to implement the control modules 142 (e.g., implement the functionality of program control 160) and the other techniques discussed herein.

As shown, the memory system 110 includes a NAND memory device 130 with multiple dies (dies 1-N), with each die including one or more blocks (blocks 1-N). Each of the one or more blocks may include further divided portions, such as one or more wordlines (not shown) per block; and each of the one or more wordlines may be further comprised of one or more pages (not shown) per wordline, depending on the number of data states that the memory cells of that wordline are configured to store.

Accessing data from the memory device 130 may comprise applying a read voltage to a wordline, wherein the voltage applied to the wordline is different than the signaling voltage used to indicate that the voltage should be applied. A voltage level shifter may be used to convert the signaling voltage in a first power domain to the read voltage in a second power domain. By using the transition time reduction techniques and circuits discussed herein, the transition time for applying or ceasing to apply the read voltage may be reduced, improving performance of the memory device 130 by reducing power consumption, increasing operating frequency, or both.

In an example, the blocks of memory cells of the memory device 130 include groups of at least one of: single-level cell (SLC), multi-layer cell (MLC), triple-layer cell (TLC), or quad-layer cell (QLC) NAND memory cells. Also, in an example, the memory device 130 is arranged into a stack of three-dimensional (3D) NAND dies. These configurations and further detailed components of the memory device 130 are not illustrated in FIG. 1 for simplicity. However, the memory device 130 may incorporate these or any of the features described above with reference to features of 3D NAND architecture devices or other forms of NAND storage devices.

In 3D architecture semiconductor memory technology, vertical structures are stacked, increasing the number of tiers, physical pages, and accordingly, the density of a memory device (e.g., a storage device). In an example, the memory system 110 can be a discrete memory or storage device component of the host device 120. In other examples, the memory system 110 can be a portion of an integrated circuit (e.g., system on a chip (SOC), etc.), stacked or otherwise included with one or more other components of the host device 120.

Each flash memory cell in a NAND architecture semiconductor memory array may be programmed to two or more programmed states. For example, an SLC may represent one of two programmed states (e.g., 1 or 0), representing one bit of data. Flash memory cells may also represent more than two programmed states, allowing the manufacture of higher density memories without increasing the number of memory cells, as each cell may represent more than one binary digit (e.g., more than one bit). Such cells may be referred to as multi-state memory cells, multi-digit cells, or multi-level cells (MLCs). In certain examples, MLC may refer to a memory cell that may store two bits of data per cell (e.g., one of four programmed states), TLC may refer to a memory cell that may store three bits of data per cell (e.g., one of eight programmed states), and a QLC may store four bits of data per cell. MLC is used herein in its broader context, to refer to any memory cell(s) that may store more than one bit of data per cell (i.e., that may represent more than two programmed states; thus, the term MLC is used herein in the broader context, to be generic to memory cells storing 2, 3, 4, or more bits of data per cell).

The memory system 110 is shown as being operably coupled to a host 120 via a controller 140 of the memory device. The controller 140 is adapted to receive and process host IO commands 125, such as read commands, write commands, erase commands, and the like, to read, write, erase, and manage data stored within the memory device 130. In other examples, the memory controller 140 may be physically separate from an individual memory device, and may receive and process commands for one or more individual memory devices. A variety of other components for the memory system 110 (such as a memory manager, and other circuitry or operational components) and the controller 140 are also not depicted for simplicity.

The controller 140 is depicted as including a memory 144 (e.g., volatile memory), processing circuitry 146 (e.g., a microprocessor), and a storage media 148 (e.g., non-volatile memory), used for executing instructions (e.g., instructions hosted by the storage media 148, loaded into memory 144, and executed by the processing circuitry 146) to implement the control modules 142 for management and use of the memory device 130. The functionality provided by the control modules 142 may include, but is not limited to: IO operation monitoring 150 (e.g., to monitor read and write IO operations, originating from host commands); host operation processing 155 (e.g., to interpret and process the host IO commands 125, and to issue further commands to the memory array 130 to perform respective read, write, erase, or other host-initiated operations); program control 160 (e.g., to control the timing, criteria, conditions, and parameters of respective CFByte operations 185 on the memory device 130); read voltage control 170 (e.g., to establish, set, and utilize a read voltage level to read a particular portion of the memory device 130); verify calibration 180 (e.g., to verify the read voltage level of a particular portion or portions of the memory device 130); and error detection processing 190 (e.g., to identify and correct errors from data obtained in read operations, to identify one or more raw bit error rates (RBER(s)) for a particular read operation or set of operations, etc.).

One or more communication interfaces can be used to transfer the host commands 125 between the memory system 110 and one or more other components of the host device 120, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 120 can include a host system, an electronic device, a processor, a memory card reader, or one or more other electronic devices external to the memory system 110. In some examples, the host device 120 may be a machine having some portion, or all, of the components discussed in reference to the machine 1000 of FIG. 10.

In an example, the host operation processing 155 is used to interpret and process the host IO commands 125 (e.g., read and write commands) and initiate accompanying commands in the controller 140 and the memory device 130 to accomplish the host IO commands 125. Further, the host operation processing 155 may coordinate timing, conditions, and parameters of the program control 160 in response to the host IO commands 125, IO operation monitoring 150, and error detection processing 190.

The IO operation monitoring 150 operates, in some example embodiments, to track reads and writes to the memory device 130 initiated by host IO commands. The IO operation monitoring 150 also operates to track accompanying IO operations and states, such as a host IO active or inactive state (e.g., where an active state corresponds to the state of the controller 140 and memory device 130 actively performing read or write IO operations initiated from the host 120, and where an inactive state corresponds to an absence of performing such IO operations initiated from the host 120). The IO operation monitoring 150 may also monitor voltage level and read error rates occurring with the IO operations initiated from the host 120, in connection with determining parameters for the program control 160 as discussed herein.

The program control 160 can include, among other things, circuitry or components (hardware and/or software) configured to control memory operations associated with writing data to, reading data from, or erasing one or more memory cells of the memory device 130 coupled to the memory controller 140. In an example, the program control 160 operates to identify parameters in the memory device 130 and controller 140 for scheduling and conducting a CFByte operation 185, such as based on the IO conditions (e.g., indicated by the IO operation monitoring 150) or error conditions (e.g., indicated by the error detection processing 190). By comparing the read CFByte value against a target value, the charge loss of the memory device can be determined and used to update the read voltage to extend the life of the memory device. The read voltage control 170 further operates to initiate and perform the CFByte operation 185 based on these or other parameters, through synchronous or asynchronous event processing.

The read voltage control 170, in some example embodiments, is used to establish, change, and provide a voltage value used to read a particular layer of an area of memory (such as a respective block in the memory device 130). For example, the read voltage control 170 may implement various positive or negative offsets in order to read respective memory cells and their layers. A voltage level shifter may be used to transition control signals from a first power domain to control signals in a second power domain. The operating voltage of the second power domain may be controlled by the read voltage control 170. For example, a common ground may be used in the two power domains, a fixed voltage source used as the operating voltage of the first power domain, and the output of a voltage source, configured by the read voltage control 170, used as the operating voltage of the second power domain.

In an example, the verify calibration 180 is used to establish (e.g., change, update, reset, etc.) whether or not a calibration operation should be performed after a program or read operation. The verify calibration 180 may be implemented based on a number or percentage of bits in the NAND memory device 130 that were successfully read at a current read voltage level.

The error detection processing 190, in some example embodiments, may detect a recoverable error condition (e.g., a RBER value or an RBER trend), an unrecoverable error condition, or other measurements or error conditions for a memory cell, a group of cells, or larger areas of the memory array (e.g., averages or samples from a block, group of blocks, die, group of dies, etc.).

Additionally, the sampling and read operations that are performed in a read scan by the program control 160 may allow configuration, such as from a specification (e.g., a determined setting or calculation) of: a size of data (e.g., data corresponding to a page, block, group of blocks, die) that is programmed; a number of pages in total that are programmed; a number of pages within a block that are programmed; whether certain cells, pages, blocks, dies, or certain types of such cells, pages, blocks, dies are or are not programmed; and the like. Likewise, the program control 160 may control or allow configuration of the number of program cycles that are performed before the first verify cycle, the number of program cycles that are performed between verify cycles, the number of bits to be successfully programmed at each level before next-level verification begins, or any suitable combination thereof.

In addition to the techniques discussed herein, other types of maintenance operations may be implemented by the control modules 142 in the controller 140. Such operations may include garbage collection or reclamation, wear leveling, block management, and other forms of background activities performed upon the memory device 130. Such background activities may be triggered during an idle state detected by the IO operation monitoring 150, such as immediately following or concurrently with a read scan operation.

The program control 160 can include an error correction code (ECC) component, which can include, among other things, an ECC engine or other circuitry configured to detect or correct errors associated with writing data to or reading data from one or more memory cells of the memory device 130 coupled to the memory controller 140. The memory controller 140 can be configured to actively detect and recover from error occurrences (e.g., bit errors, operation errors, etc.) associated with various operations or storage of data, while maintaining integrity of the data transferred between the host device 120 and the memory system 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory device 130 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory system 110 in pages, and erased in blocks. However, one or more memory operations (e.g., read, write, erase, etc.) can be performed on larger or smaller groups of memory cells, as desired. The data transfer size of a NAND memory system 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory devices 130 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
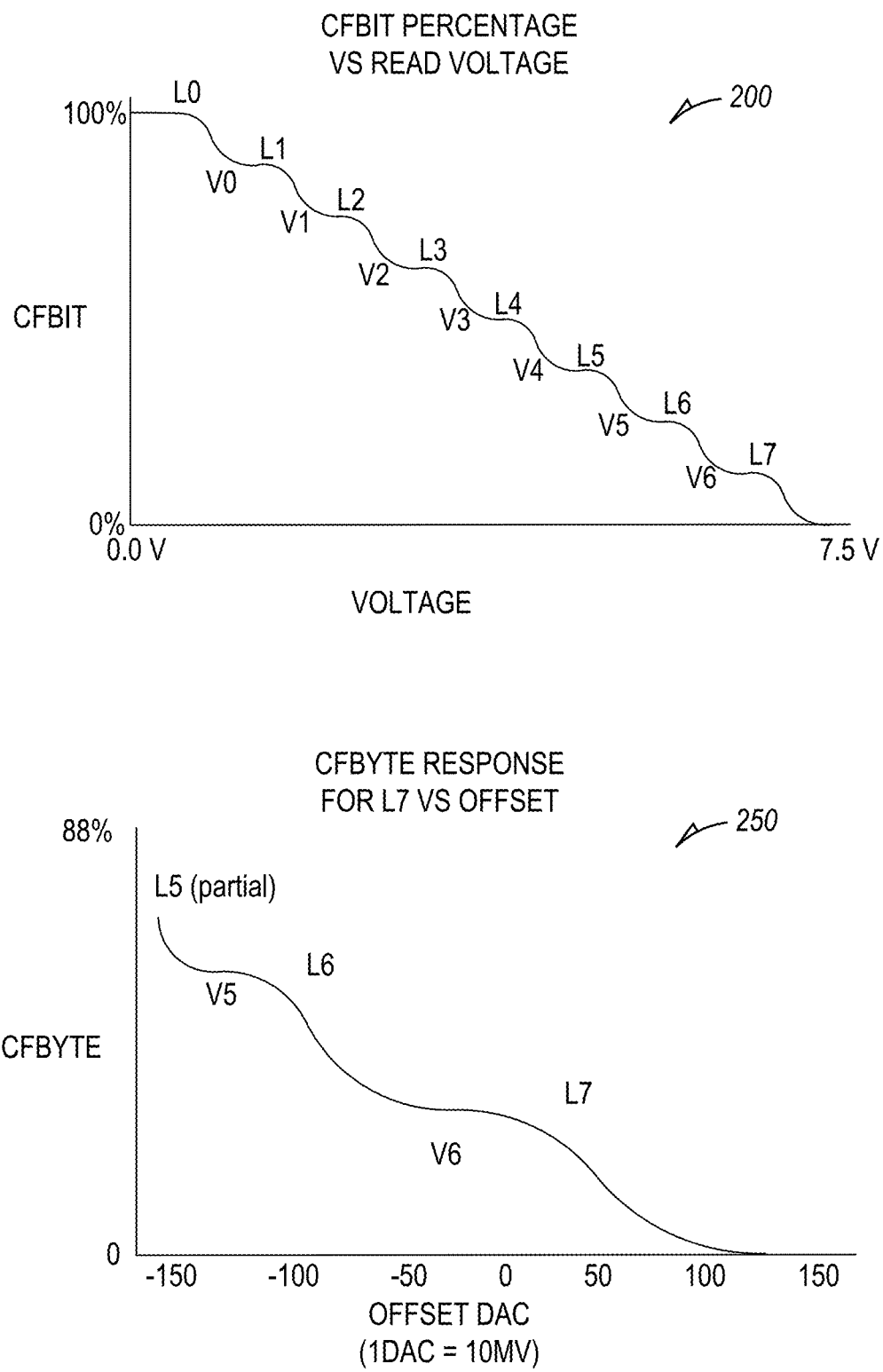
FIG. 2 shows graphs of count fail bit (CFBit) and count fail byte (CFByte) responses for a memory component, in accordance with some embodiments of the present disclosure.

FIG. 2 shows a graph 200 of CFBit responses for a memory component and a graph 250 of CFByte responses for the memory component, in accordance with some embodiments of the present disclosure. The graph 200 is labeled with the threshold voltages for the nominal levels L0-L7. In an ideal memory component, each memory cell would have a threshold voltage at an exact value of one of L0-L7 and no memory cells would have other threshold voltages. In a real memory component, the threshold voltages for each logical cell value are in a distribution around the ideal voltage. The fewest memory cells should have threshold voltages at the valley voltages V0-V6. Thus, by reading data using the valley voltages, the fewest read errors will occur. For example, a memory cell that is nominally at L4, but is actually somewhat below L4, will still likely be above V3. At the same time, a memory cell that is nominally at L3, but is actually somewhat above L3, will still likely be below V3. Due to device characteristics, slow charge loss, temperature effects, and the like, the positions of the valleys may change for a particular device. Compensating for these changes allows the device to continue to function without excessive errors, such as reading data values that are different from those that were written.

The graph 200 shows the CFBit read percentage as a function of read voltage percentage over the entire read voltage range for a memory device. If the 3-bit values stored in each memory cell are evenly distributed, the CFBit graph 200 results.

The graph 250 shows the CFByte response for a memory component as a function of a voltage offset value from a nominal read value for the seventh level (L7) of the memory component. Since CFByte shows the number of bytes having at least one memory cell with a threshold voltage above the read voltage, the largest changes in CFByte occur at the higher threshold voltages (e.g., among L5, L6, and L7). Only bytes in which all memory cells store the lowest voltage will not be CFBytes at V0, for example.

The graph 200 shows that at a minimum read voltage (e.g., 0 V), all memory cells store voltages above the read voltage and thus CFByte is at 100% of the memory cells. At a maximum read voltage (e.g., 7.5 V), all memory cells store voltages below the read voltage and thus CFByte is at 0% of the memory cells. As the read voltage increases from the minimum to the maximum, the CFByte percentage decreases. The CFByte value changes quickly as a function of read voltage when the read voltage is near the target voltage for a level, as many memory cells are storing voltages slightly above or below the target voltage. The CFByte value changes slowly as a function of read voltage when the read voltage is between adjacent target voltages, as few memory cells are storing voltages for which it is difficult to determine which target voltage was intended. Thus, the graph 200 has a roughly stair-step shape, with the center of the flatter portions indicating the read voltages that best distinguish between adjacent target voltages. The voltage range of 0-7.5 V shown in the graph 200 is by way of example only, as different devices have different operating voltage ranges.

The vertical axis of the graph 250 shows CFByte values as a percentage. The horizontal axis shows voltage adjustments from a nominal read value, measured in DACs. In this example, the 0 offset value is not at the center of the flattest portion of the curve between the L6 and L7 voltages and is instead closer to the L7 voltage. As a result, using the nominal read voltage will result in some L7 values being erroneously read as L6 values. By adjusting the read voltage down by about −40 DACs, the error rate will be reduced.

Figure 3:
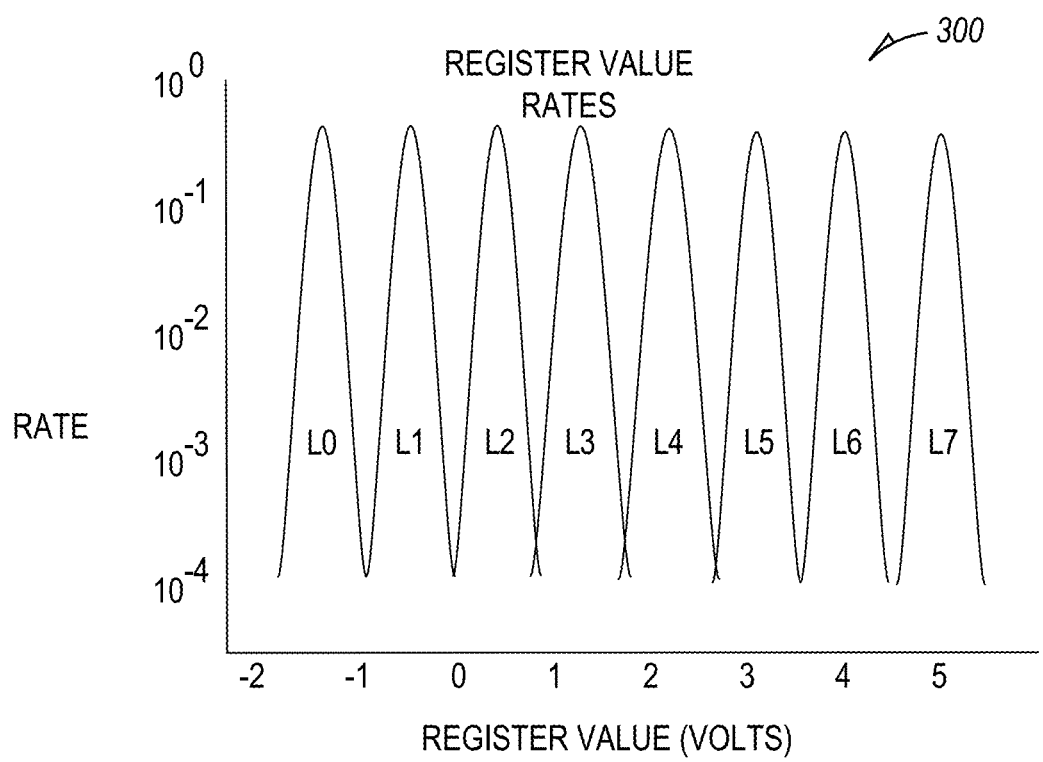
FIG. 3 is a graph of register rate values for a memory component, in accordance with some embodiments of the present disclosure.

FIG. 3 is a graph 300 of register rate values for a memory component, in accordance with some embodiments of the present disclosure. As can be seen in the graph 300, the voltage distribution for data peaks near the target voltage value for each of L0-L7. However, the voltages are not entirely at the target voltage. Some of the voltage distributions overlap, such as the L2 and L3 distributions. As a result, regardless of the read voltage used, some L2 values will be read as L3 values or vice versa. By using read voltages located at the positions of minimum overlap, the number of read errors is minimized.

Figure 4:
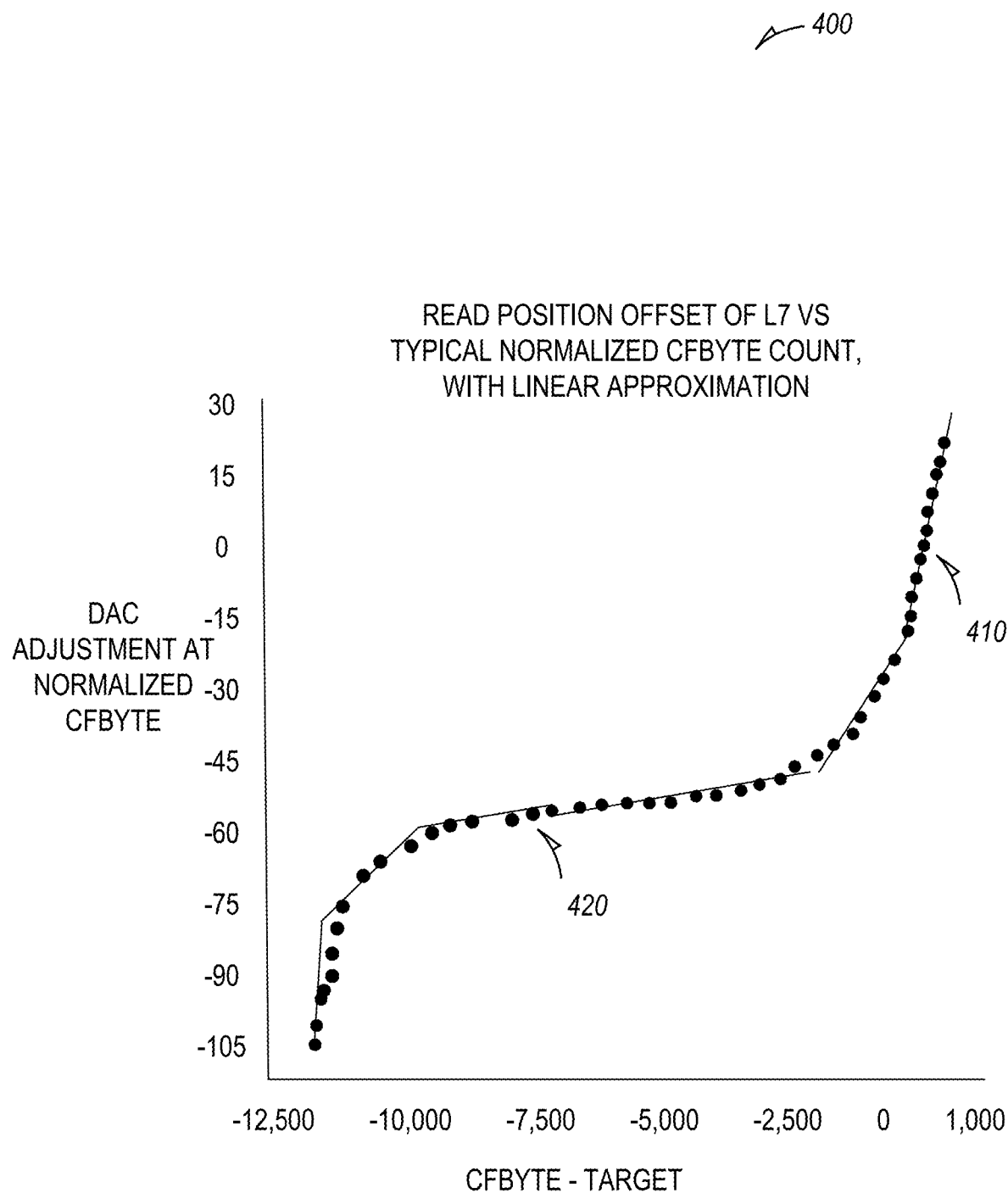
FIG. 4 is a graph showing a relationship between CFByte values and digital-to-analog converter (DAC) adjustments, along with linear approximations for a typical memory component, in accordance with some embodiments of the present disclosure.

FIG. 4 is a graph 400 showing a relationship between CFByte values and DAC adjustments, along with linear approximations for a typical memory component, in accordance with some embodiments of the present disclosure. The points show example measurements. The lines show a linear approximation of the curve formed by the points.

The target CFByte value for L7 values is indicated by the arrow 410. The arrow 410 indicates the target CFByte value for the center of the flat part of the curve of graph 250 of FIG. 2, delineating between the areas of rapid change in CFByte in the voltage distribution curves of L6 and L7. When CFByte equals the target value at the point pointed to by the arrow 410, the DAC adjustment is 0.

When CFByte is below the target value, as shown by points to the left of the arrow 420, the DAC adjustment should be reduced in order to increase the number of memory cells with stored voltage above the read voltage, bringing CFByte in alignment with the target. For example, if CFByte is 7,500 cells below the target value, the arrow 420 shows that the DAC adjustment is about −55. The DAC adjustment may be measured in steps of 10 mV. In that example, the DAC adjustment would be −550 mV. After applying the DAC adjustment and reducing the read voltage, CFByte may be determined again. If the updated CFByte is within a predetermined threshold of the target (e.g., measured as a number of cells or a percentage of the target value), the DAC adjustment may be accepted and used for future reads. If the magnitude of the difference between CFByte and the target is above the predetermined threshold, the process may be repeated.

Instead of storing an individual DAC adjustment value for each possible value of CFByte—target, an approximation of the data may be stored and used to look up DAC adjustments. For example, a piecewise linear approximation, as stored in the linear approximation table 740 of FIG. 7, discussed below, may be used. The CFByte—target value is compared to a stored range for one or more of a plurality of linear segments. One of the linear segments is identified based on the CFByte—target value and the stored range and the piecewise linear approximation of the linear segment is used to determine the DAC adjustment. The piecewise linear approximation may be defined by a value at one end of the range (e.g., the lower value) and a slope. For example, the linear segment including the CFByte—target value indicated by the arrow 420 may be defined as having a range of −10,000 to −7,500 (CFByte-target) with a starting value of −60 (DAC adjustment) and a slope of 0.002 (DAC adjustment per CFByte—target). The piecewise linear approximation has greater accuracy than a single linear approximation and uses less storage than storing a DAC adjustment value for every value of CFByte—target.

Figure 5:
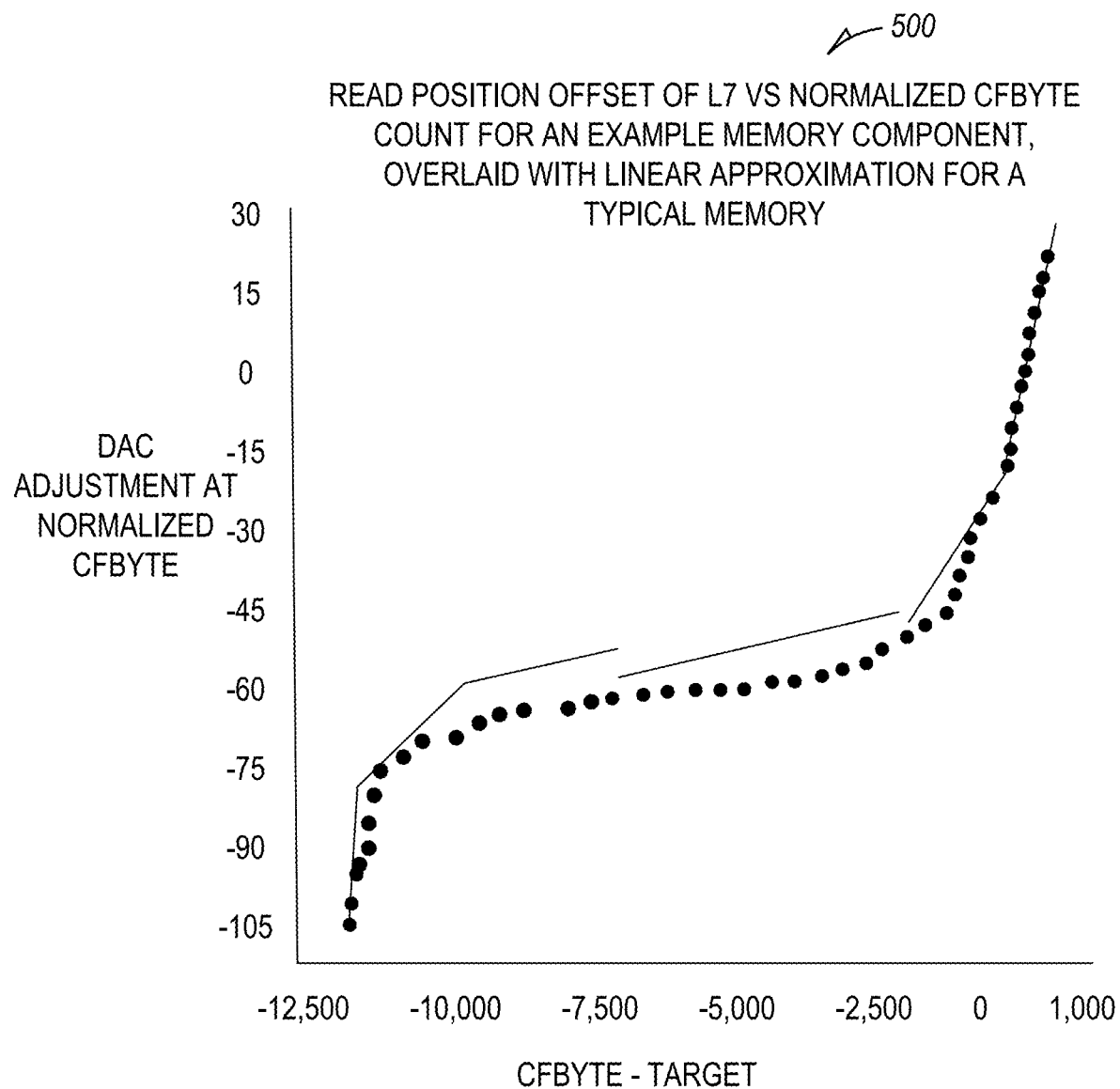
FIG. 5 is a graph showing a relationship between CFByte values and DAC adjustments for an example memory component, overlaid with linear approximations for a typical memory component, showing that an individual memory component may not align well with data generated for typical memory components.

FIG. 5 is a graph 500 showing a relationship between CFByte values and DAC adjustments for an example memory component, overlaid with linear approximations for a typical memory component, showing that an individual memory component may not align well with data generated for typical memory components. The points show example DAC adjustments to correct the CFByte value to equal the target. The lines show a linear approximation of the curve formed by the points of the graph 400 of FIG. 4.

As can be seen in the graph 500, the points are substantially below the lines when CFByte—target is in the range of −10,000 to 0. Thus, the DAC adjustments that will cause CFByte to equal the target are lower in value (e.g., about −60 at −7,500 instead of −50) and greater in magnitude. Applying the linear approximation for a typical device to this atypical device will result in an increased number of iterations before a satisfactory DAC value (e.g., a DAC value for which the difference between CFByte and a target value is below a predetermined threshold) is reached.

Figure 6:
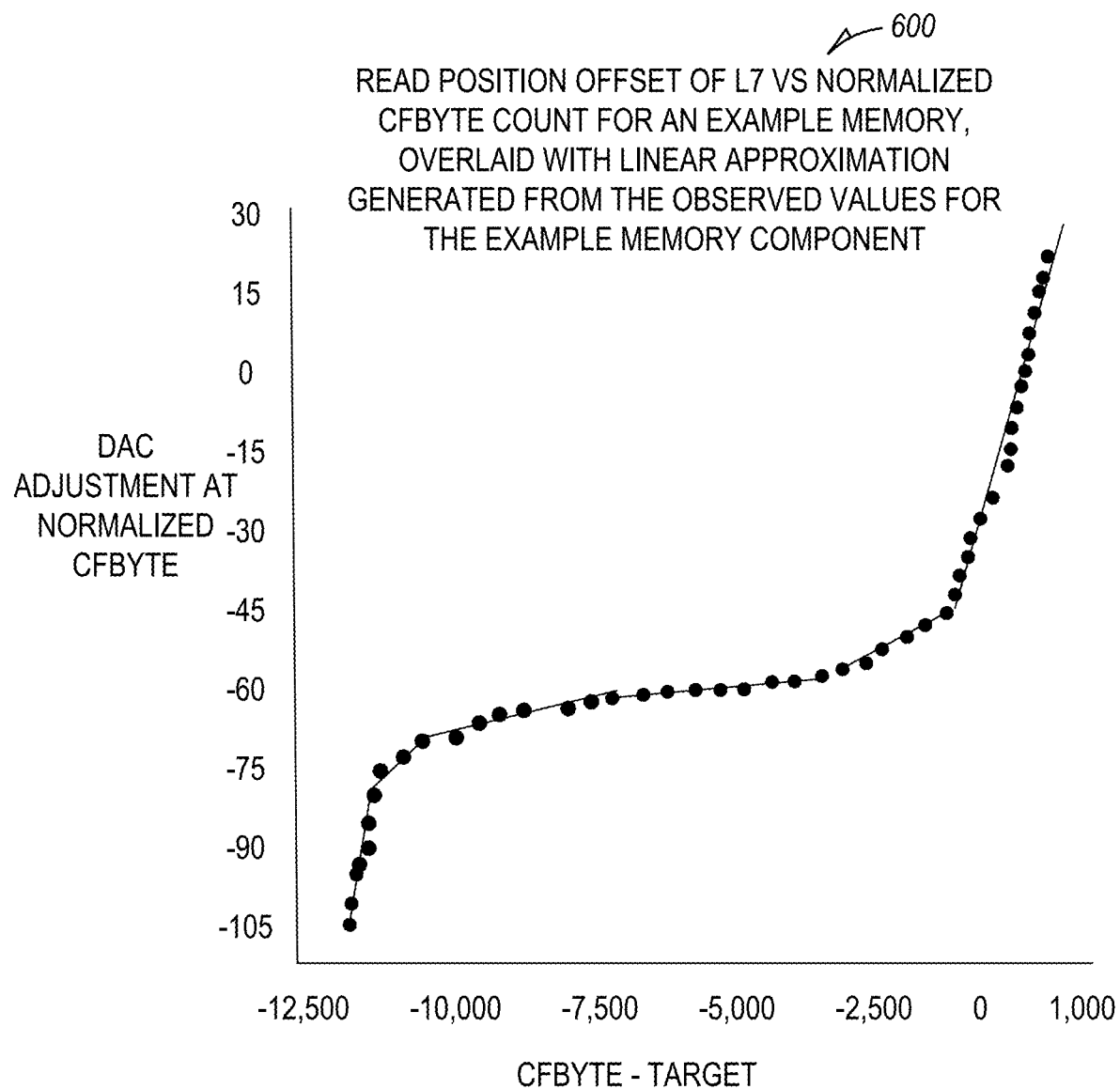
FIG. 6 is a graph showing a relationship between CFByte values and DAC adjustments for the example memory component of FIG. 5, along with linear approximations generated from the observed values for the example memory component, in accordance with some embodiments of the present disclosure.

FIG. 6 is a graph 600 showing a relationship between CFByte values and DAC adjustments for the example memory component of FIG. 5, along with linear approximations generated from the observed values for the example memory component, in accordance with some embodiments of the present disclosure. The points are the same as those shown in FIG. 5, but the linear approximation is one that is calculated for the particular device based on the data points. As a result, DAC adjustments determined using the device-specific linear approximation will be more efficient (e.g., using fewer iterations) than those determined using the typical linear approximations of FIGS. 4 and 5.

FIG. 7 illustrates a database schema 700 suitable for use in charge loss tracking through targeted CFByte value. The database schema 700 includes a CFByte targets table 710 and a linear approximations table 740. The CFByte targets table 710 includes rows 730A, 730B, 730C, 730D, 730E, 730F, 730G, and 730H of a format 720. The linear approximations table 740 includes rows 760A, 760B, 760C, 760D, 760E, and 760F of a format 750.

The CFByte targets table 710 comprises one row for each valley of a TLC. Each row indicates the number of bytes comprising memory cells that are all expected to be at or above the corresponding level. In the example of FIG. 7, the CFByte targets table 710 stores targets for a memory component with 100,000 memory cells. Using a scrambler, the number of cells at each level is expected to be approximately equal. However, since a byte comprises multiple memory cells, the target value steps in a non-linear fashion. Since the CFByte target values at the lower valleys (e.g., V0, V1, V2, and V3) are close in value, the CFByte target values at the higher values (e.g., V4, V5, and V6) may be used to determine a read offset voltage that is applied to all read voltages. Using the CFByte targets, the read voltages can be adjusted until the CFByte value at the read voltage equals (or is within a predetermined threshold distance from) the target CFByte value.

The linear approximations table 740 comprises one row for each linear segment approximating the relationship between DAC adjustments and differences between CFByte and the CFByte target value. For example, the linear segments shown in FIG. 4 may be approximated using the linear approximations of the rows 760A-760F.

Figure 8A:
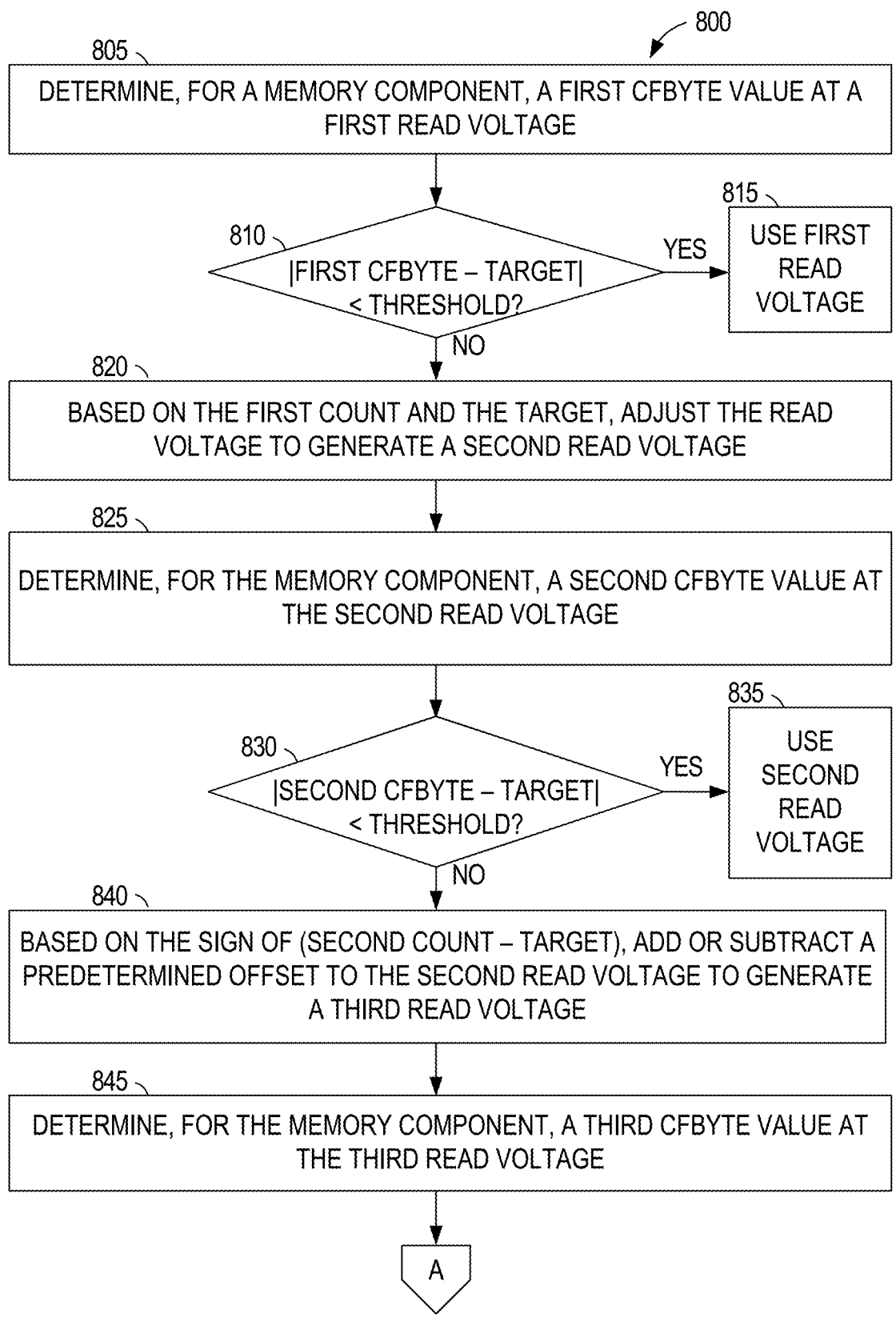
FIGS. 8A and 8B are a flow diagram of an example method for charge loss tracking through targeted CFByte value, in accordance with some embodiments of the present disclosure.
Figure 8B:
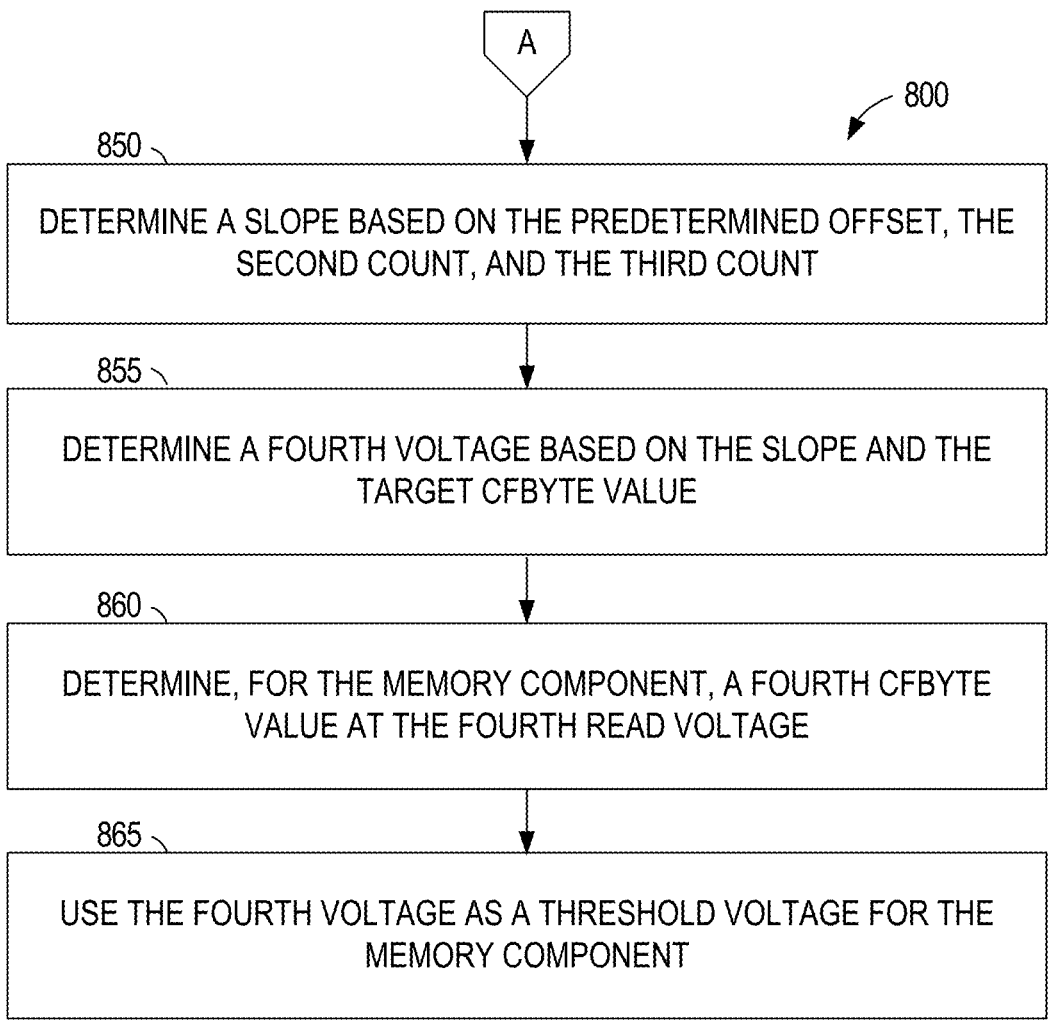

FIGS. 8A and 8B are a flow diagram of an example method 800 for charge loss tracking through targeted CFByte value, in accordance with some embodiments of the present disclosure. The method 800 includes operations 805, 810, 815, 820, 825, 830, 835, 840, 845, 850, 855, 860, and 865. By way of example and not limitation, the operations 805-865 may be performed by the controller 140 of FIG. 1 and its modules.

In operation 805, the CFByte operation 185, initiated by the read voltage control 180, determines, for a memory component, a first CFByte value at a first voltage. For example, a current read voltage value (e.g., V6) for a data level (e.g., L7) may be used to generate a CFByte value for the memory device 130 or a die of the memory device 130. The CFByte value may be compared to a target value for the data level (e.g., a value stored in the CFByte targets table 710).

If the difference between the CFByte value and the target value is below a predetermined threshold (e.g., 1% of the target value, 1% of the number of memory cells of the memory component, 0.1% of the target value, or 0.1% of the number of memory cells of the memory component) in operation 810, the first read voltage is used (operation 815). However, if the difference between the CFByte value and the target value meets or exceeds the predetermined threshold, read voltage recalibration continues with operation 820.

In operation 820, based on the first count and the target, the read voltage control 180 determines a voltage adjustment using a lookup table, such as the linear approximations table 740 that stores piecewise linear approximations for a model (e.g., a particular product identifier from a particular manufacturer) of the memory component. The voltage adjustment is added to the first read voltage to generate a second read voltage.

The CFByte value (second CFByte value) for the second read voltage is determined in operation 825. If the CFByte value for the second read voltage is within a predetermined distance from the target CFByte value (operation 830), the second read voltage is used in operation 835. Otherwise, read voltage calibration continues with operation 840.

In operation 840, a predetermined offset voltage is added or subtracted from the second read voltage to generate a third read voltage. If the second CFByte value is greater than the target CFByte value, the second read voltage is lower than the target voltage. If the second CFByte value is less than the target CFByte value, the second read voltage is higher than the target voltage. The predetermined offset voltage is added or subtracted so that the third read voltage is farther from the target value. Thus, the magnitude of CFByte—target will be greater for the third read voltage than for the second read voltage. This may ensure that the third read voltage is not on the other side of the target read voltage than the second read voltage.

The CFByte value (third CFByte value) for the third read voltage is determined in operation 845. Since the third read voltage is farther from the target read voltage than the second read voltage and since the CFByte value for the second read voltage was not within the predetermined threshold of the target CFByte value, there is no need to check the third count against target CFByte value: it will not be within the threshold distance.

The predetermined offset, the second count, and the third count are used, in operation 850, to determine a slope of a line connecting the two measured data points.

$$\text{Slope} = \frac{\text{predetermined offset voltage}}{\text{Third } CFByte \text{ Value} - \text{Second } CFByte \text{ Value}}$$

The read voltage control 180, in operation 855, determines a fourth voltage based on the slope and the target CFByte value. For example, data in the linear approximations table 740 of FIG. 7 may be updated based on the predetermined offset, the first count, the second count, or the slope. The updated linear approximations table 740 may be used to determine the fourth voltage. Alternatively, the slope determined in operation 850 may be used to determine the intersection point of a line with the target count. For example:

Fourth Voltage = Third Voltage+Slope(Third $CFByte$ – target $CFByte$)

The fourth voltage is used thereafter as a threshold voltage for the memory component (operation 950) until another calibration is performed. As a result, the bit error rate is reduced compared with systems that do not perform read calibration. The number of calibration reads is reduced compared with systems that use a lookup table but do not measure actual data for the individual device.

Figure 9:
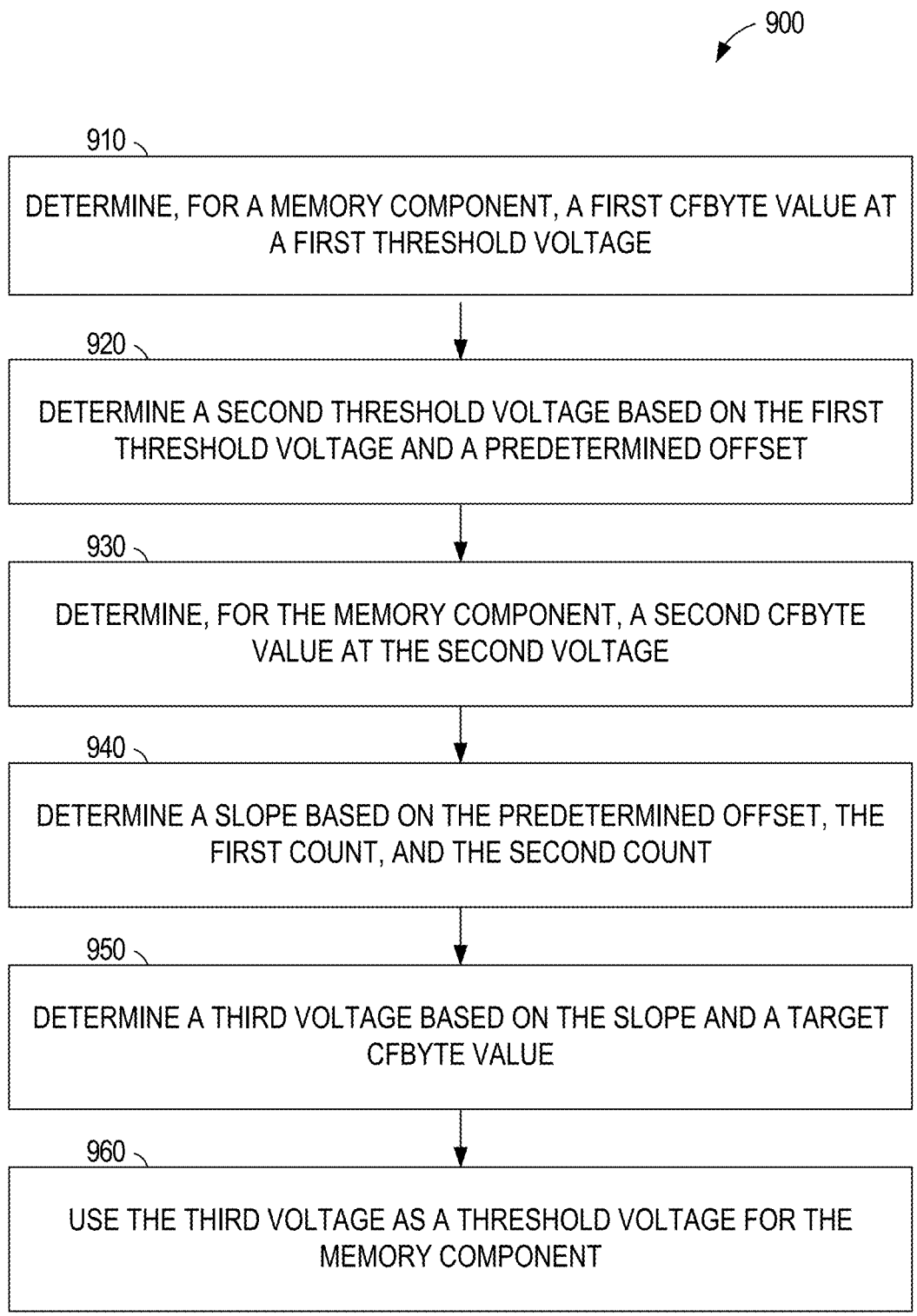
FIG. 9 is a flow diagram of an example method for charge loss tracking through targeted CFByte value, in accordance with some embodiments of the present disclosure.

FIG. 9 is a flow diagram of an example method 900 for charge loss tracking through targeted CFByte value, in accordance with some embodiments of the present disclosure. The method 900 includes operation 910, 920, 930, 940, 950, and 960. By way of example and not limitation, the operations 910-960 may be performed by the controller 140 of FIG. 1 and its modules.

In operation 910, the CFByte operation 185, initiated by the read voltage control 180, determines, for a memory component, a first CFByte value at a first voltage. For example, a current read voltage value (e.g., V6) for a data level (e.g., L7) may be used to generate a CFByte value for the memory device 130 or a die of the memory device 130. The CFByte value may be compared to a target value for the data level (e.g., a value stored in the CFByte targets table 710). If the difference between the CFByte value and the target value is below a predetermined threshold (e.g., 1% of the target value, 1% of the number of memory cells of the memory component, 0.1% of the target value, or 0.1% of the number of memory cells of the memory component) operations 920-960 are skipped and the current read voltage continues to be used. However, if the difference between the CFByte value and the target value meets or exceeds the predetermined threshold, read voltage recalibration is performed using operation 920-960.

Based on the first count, the read voltage control 180 may determine a voltage adjustment based on the first count and a lookup table, such as the linear approximations table 740 that stores piecewise linear approximations for a model (e.g., a particular product identifier from a particular manufacturer) of the memory component. A candidate read voltage may be determined by applying the voltage adjustment to the first voltage. If the CFByte for the candidate voltage is within a predetermined distance from the target CFByte value, operations 920-950 may be skipped, and the candidate voltage used as a threshold voltage for the memory component.

In operation 920, the read voltage control 180 determines a second threshold voltage based on the first threshold voltage and a predetermined offset. For example, the read voltage control 180 may make a small adjustment to the read voltage (e.g., by adding or subtracting 5 or 10 from the DAC adjustment).

The CFByte operation 185 is repeated, in operation 930, determining a second CFBtye value at the second voltage. The predetermined offset, the first CFByte value, and the second CFByte value are used, in operation 940, to determine a slope of a line connecting the two measured data points.

$$\text{Slope} = \frac{\text{Predetermined Offset}}{\text{Second } CFByte - \text{First } CFByte}$$

In some example embodiments, operation 930 is repeated to gather additional information for calculation of the slope. For example, the second voltage may be determined by adding an offset to the first voltage and an additional voltage may be determined by subtracting the offset from the first voltage. An additional CFByte value for the additional voltage is determined. Two or more of the first count, the second count, the additional count, the first voltage, the second voltage, and the additional voltage are used to determine the slope. For example, the equation below may be used.

$$\text{Slope} = \frac{\text{Second Voltage} - \text{Additional Voltage}}{\text{Second Count} - \text{Additional Count}}$$

The read voltage control 180, in operation 950, determines a third voltage based on the slope and a target CFByte value. For example, data in the linear approximations table 740 of FIG. 7 may be updated based on the first voltage, the second voltage, the predetermined offset, the first count, the second count, the slope, or any suitable combination thereof. The updated linear approximations table 740 may be used to determine the third voltage. To illustrate, consider a memory device that is calibrating the read voltage for V5. The CFByte for V5 (i.e., the number of cells storing voltage above a nominal read voltage for V5) is determined to be, in this example, 50,000. The target value is retrieved from the row 730F as being 58,000. Thus, CFByte—target is −8,000. The determined value is above the beginning value of the row 760C and below the beginning value of the row 760D. Accordingly, the linear approximation of the row 760C is used. The DAC offset to apply is determined as (Beginning DAC Offset)+(Slope) (CFByte—target−beginning value). In this example, the equation becomes −60+0.002(2,000)=−56. Accordingly, a DAC offset of −56 is applied to the nominal read voltage for V5 to determine a modified read voltage to use.

The third voltage (e.g., the nominal read voltage adjusted by the determined DAC offset) is used thereafter as a threshold voltage for the memory component (operation 960) until another calibration is performed. As a result, the bit error rate is reduced compared with systems that do not perform read calibration.

The operation 910 may be repeated using the third voltage. If the new CFByte value is within the predetermined threshold of the target, calibration is complete. Otherwise, operations 920-960 are repeated, adjusting the read voltage again. Multiple iterations may be performed until a predetermined number of iterations have been performed or a read voltage is found that results in a CFByte value within the predetermined threshold of the target CFByte value.

The linear approximations table 740 may be pre-populated when a memory device is produced or shipped, based on a population average of similar memory devices. By updating the data in the linear approximations table 740 for an individual device, the number of iterations of the operations 910-960 may be reduced, improving performance of the memory device.

Example 1 is a memory system comprising: a memory component comprising a plurality of memory cells; and a processing device programmed to perform operations comprising: determining, for the memory component, a first count fail byte (CFByte) value at a first threshold voltage; determining a second threshold voltage based on the first threshold voltage and a predetermined offset; determining, for the memory component, a second CFByte value at the second threshold voltage; determining a slope based on the predetermined offset, the first CFByte value, and the second CFByte value; determining a third voltage based on the slope and a target CFByte value; and using the third voltage as a threshold voltage for the memory component.

In Example 2, the subject matter of Example 1, wherein the operations further comprise: based on the first CFByte value and a lookup table, determining a voltage adjustment; determining a candidate voltage by applying the voltage adjustment to the first threshold voltage; determining, for the memory component, a third CFByte value at the candidate voltage; and determining that a difference between the third CFByte value and the target CFByte value exceeds a predetermined threshold.

In Example 3, the subject matter of Example 2, wherein the lookup table stores piecewise linear approximations for a model of the memory component.

In Example 4, the subject matter of Examples 1-3, wherein the operations further comprise determining a third CFByte value at the third voltage, wherein the using of the third voltage as the threshold voltage for the memory component is based on the third CFByte value and the target CFByte value.

In Example 5, the subject matter of Example 4, wherein the using of the third voltage as the threshold voltage for the memory component is based on a difference between the third CFByte value and the target CFByte value being less than a predetermined threshold.

In Example 6, the subject matter of Example 5 wherein the predetermined threshold is less than 1% of a number of memory cells in the memory component.

In Example 7, the subject matter of Examples 5-6 wherein the predetermined threshold is less than 0.1% of a number of memory cells in the memory component.

In Example 8, the subject matter of Examples 1-7, wherein the operations further comprise determining a third CFByte value at a fourth voltage, wherein the determining of the slope is further based on the third CFByte value and the fourth voltage.

Example 9 is a method comprising: determining, by a memory controller and for a memory component, a first count fail byte (CFByte) value at a first threshold voltage; determining, by the memory controller and for the memory component, a second threshold voltage based on the first threshold voltage and a predetermined offset; determining, by the memory controller and for the memory component, a second CFByte value at the second threshold voltage; determining, by the memory controller, a slope based on the predetermined offset, the first CFByte value, and the second CFByte value; determining, by the memory controller, a third voltage based on the slope and a target CFByte value; and using the third voltage as a threshold voltage for the memory component.

In Example 10, the subject matter of Example 9 includes, based on the first CFByte value and a lookup table, determining a voltage adjustment; determining a candidate voltage by applying the voltage adjustment to the first threshold voltage; determining, for the memory component, a third CFByte value at the candidate voltage; and determining that a difference between the third CFByte value and the target CFByte value exceeds a predetermined threshold.

In Example 11, the subject matter of Example 10, wherein the lookup table stores piecewise linear approximations for a model of the memory component.

In Example 12, the subject matter of Examples 9-11 includes determining a third CFByte value at the third voltage, wherein the using of the third voltage as the threshold voltage for the memory component is based on the third CFByte value and the target CFByte value.

In Example 13, the subject matter of Example 12, wherein the using of the third voltage as the threshold voltage for the memory component is based on a difference between the third CFByte value and the target CFByte value being less than a predetermined threshold.

In Example 14, the subject matter of Example 13 wherein the predetermined threshold is less than 1% of a number of memory cells in the memory component.

In Example 15, the subject matter of Examples 13-14 wherein the predetermined threshold is less than 0.1% of a number of memory cells in the memory component.

In Example 16, the subject matter of Examples 9-15 includes determining a third CFByte value at a fourth voltage, wherein the determining of the slope is further based on the third CFByte value and the fourth voltage.

Example 17 is a non-transitory machine-readable storage medium comprising instructions that, when executed by a processing device, cause the processing device to perform operations comprising: determining, for a memory component, a first count fail byte (CFByte) value at a first threshold voltage; determining a second threshold voltage based on the first threshold voltage and a predetermined offset; determining, for the memory component, a second CFByte value at the second threshold voltage; determining a slope based on the predetermined offset, the first CFByte value, and the second CFByte value; determining a third voltage based on the slope and a target CFByte value; and using the third voltage as a threshold voltage for the memory component.

In Example 18, the subject matter of Example 17, wherein the operations further comprise: based on the first CFByte value and a lookup table, determining a voltage adjustment; determining a candidate voltage by applying the voltage adjustment to the first threshold voltage; determining, for the memory component, a third CFByte value at the candidate voltage; and determining that a difference between the third CFByte value and the target CFByte value exceeds a predetermined threshold.

In Example 19, the subject matter of Example 18, wherein the lookup table stores piecewise linear approximations for a model of the memory component.

In Example 20, the subject matter of Examples 17-19, wherein the operations further comprise determining a third CFByte value at the third voltage, wherein the using of the third voltage as the threshold voltage for the memory component is based on the third CFByte value and the target CFByte value.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 10:
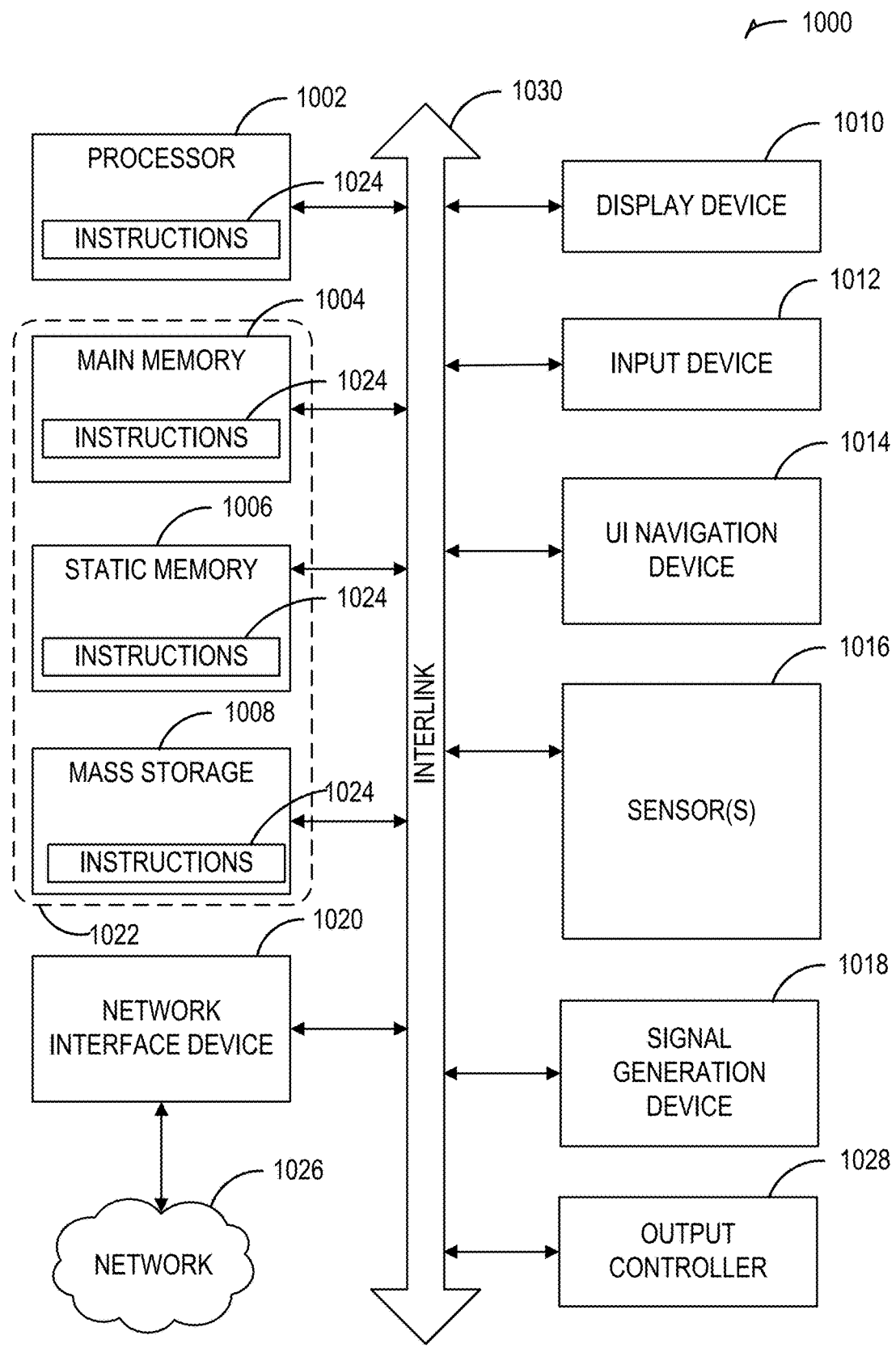
FIG. 10 is a block diagram of an example computer system in which embodiments of the present disclosure may operate.

FIG. 10 illustrates an example machine of a machine 1000 within which a set of instructions can be executed for causing the machine to perform any one or more of the methodologies discussed herein. In some embodiments, the machine 1000 can correspond to a host system that includes, is coupled to, or utilizes a memory sub-system (e.g., the memory sub-system 100 of FIG. 1) or can be used to perform the operations of a controller (e.g., to execute an operating system to execute instructions 1024 for adjusting read voltages based on CFByte values). In an example, the controller can include memory to store offset voltage adjustments for memory components. The instructions 1024 may include, for example, instructions 1024 and/or logic described herein. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a PC, a tablet PC, a STB, a PDA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1000 (e.g., computer system) can include a hardware processor 1002 (e.g., a central processing unit (CPU), a graphics processing unit (GPU), a hardware processor core, or any combination thereof), a main memory 1004, a static memory 1006 (e.g., memory or storage for firmware, microcode, a basic-input-output (BIOS), unified extensible firmware interface (UEFI), etc.), and mass storage device 1008 (e.g., hard drives, tape drives, flash storage, or other block devices) some or all of which can communicate with each other via an interlink 1030 (e.g., bus). The machine 1000 can further include a display device 1010, an alphanumeric input device 1012 (e.g., a keyboard), and a user interface (UI) navigation device 1014 (e.g., a mouse). In an example, the display device 1010, the input device 1012, and the UI navigation device 1014 can be a touch screen display. The machine 1000 can additionally include a signal generation device 1018 (e.g., a speaker), a network interface device 1020, and one or more sensor(s) 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1002, the main memory 1004, the static memory 1006, or the mass storage device 1008 can be, or include, a machine-readable media 1022 on which is stored one or more sets of data structures or instructions 1024 (e.g., software) embodying or used by any one or more of the techniques or functions described herein. The instructions 1024 can also reside, completely or at least partially, within any of registers of the hardware processor 1002, the main memory 1004, the static memory 1006, or the mass storage device 1008 during execution thereof by the machine 1000. In an example, one or any combination of the hardware processor 1002, the main memory 1004, the static memory 1006, or the mass storage device 1008 can constitute the machine-readable media 1022. While the machine-readable media 1022 is illustrated as a single medium, the term "machine-readable medium" can include a single medium or multiple media (e.g., a centralized or distributed database, or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media can include: non-volatile memory, such as semiconductor memory sub-systems (e.g., electrically programmable read-only memory (EPROM), electrically erasable programmable read-only memory (EEPROM)) and flash memory sub-systems; magnetic disks, such as internal hard disks and removable disks; magneto-optical disks; and CD-ROM and DVD-ROM disks.

In an example, information stored or otherwise provided on the machine-readable media 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine-readable media 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine-readable media 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, compiled, or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol, transmission control protocol (TCP), user datagram protocol (UDP), hypertext transfer protocol (HTTP), etc.). Example communication networks can include a LAN, a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 1020 can include one or more physical jacks (e.g., Ethernet, coaxial, or phone jacks) or one or more antennas to connect to the network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
    a memory component comprising a plurality of memory cells; and
    a processing device programmed to perform operations comprising:
        determining, for the memory component, a first count fail byte (CFByte) value at a first threshold voltage;
        determining a second threshold voltage based on the first threshold voltage and a predetermined offset;
        determining, for the memory component, a second CFByte value at the second threshold voltage;
        determining a slope based on the predetermined offset, the first CFByte value, and the second CFByte value;
        determining a third voltage based on the slope and a target CFByte value; and
        using the third voltage as a threshold voltage for the memory component.

2. The memory system of claim 1, wherein the operations further comprise:
    based on the first CFByte value and a lookup table, determining a voltage adjustment;
    determining a candidate voltage by applying the voltage adjustment to the first threshold voltage;
    determining, for the memory component, a third CFByte value at the candidate voltage; and
    determining that a difference between the third CFByte value and the target CFByte value exceeds a predetermined threshold.

3. The memory system of claim 2, wherein the lookup table stores piecewise linear approximations for a model of the memory component.

4. The memory system of claim 1, wherein the operations further comprise determining a third CFByte value at the third voltage, wherein the using of the third voltage as the threshold voltage for the memory component is based on the third CFByte value and the target CFByte value.

5. The memory system of claim 4, wherein the using of the third voltage as the threshold voltage for the memory component is based on a difference between the third CFByte value and the target CFByte value being less than a predetermined threshold.

6. The memory system of claim 5, wherein the predetermined threshold is less than 1% of a number of memory cells in the memory component.

7. The memory system of claim 5, wherein the predetermined threshold is less than 0.1% of a number of memory cells in the memory component.

8. The memory system of claim 1, wherein the operations further comprise determining a third CFByte value at a fourth voltage, wherein the determining of the slope is further based on the third CFByte value and the fourth voltage.

9. A method comprising:
determining, by a memory controller and for a memory component, a first count fail byte (CFByte) value at a first threshold voltage;
determining, by the memory controller and for the memory component, a second threshold voltage based on the first threshold voltage and a predetermined offset;
determining, by the memory controller and for the memory component, a second CFByte value at the second threshold voltage;
determining, by the memory controller, a slope based on the predetermined offset, the first CFByte value, and the second CFByte value;
determining, by the memory controller, a third voltage based on the slope and a target CFByte value; and
using the third voltage as a threshold voltage for the memory component.

10. The method of claim 9, further comprising:
based on the first CFByte value and a lookup table, determining a voltage adjustment;
determining a candidate voltage by applying the voltage adjustment to the first threshold voltage;
determining, for the memory component, a third CFByte value at the candidate voltage; and
determining that a difference between the third CFByte value and the target CFByte value exceeds a predetermined threshold.

11. The method of claim 10, wherein the lookup table stores piecewise linear approximations for a model of the memory component.

12. The method of claim 9, further comprising determining a third CFByte value at the third voltage, wherein the using of the third voltage as the threshold voltage for the memory component is based on the third CFByte value and the target CFByte value.

13. The method of claim 12, wherein the using of the third voltage as the threshold voltage for the memory component is based on a difference between the third CFByte value and the target CFByte value being less than a predetermined threshold.

14. The method of claim 13, wherein the predetermined threshold is less than 1% of a number of memory cells in the memory component.

15. The method of claim 13, wherein the predetermined threshold is less than 0.1% of a number of memory cells in the memory component.

16. The method of claim 9, further comprising determining a third CFByte value at a fourth voltage, wherein the determining of the slope is further based on the third CFByte value and the fourth voltage.

17. A non-transitory machine-readable storage medium comprising instructions that, when executed by a processing device, cause the processing device to perform operations comprising:
determining, for a memory component, a first count fail byte (CFByte) value at a first threshold voltage;
determining a second threshold voltage based on the first threshold voltage and a predetermined offset;
determining, for the memory component, a second CFByte value at the second threshold voltage;
determining a slope based on the predetermined offset, the first CFByte value, and the second CFByte value;
determining a third voltage based on the slope and a target CFByte value; and
using the third voltage as a threshold voltage for the memory component.

18. The non-transitory machine-readable storage medium of claim 17, wherein the operations further comprise:
based on the first CFByte value and a lookup table, determining a voltage adjustment;
determining a candidate voltage by applying the voltage adjustment to the first threshold voltage;
determining, for the memory component, a third CFByte value at the candidate voltage; and
determining that a difference between the third CFByte value and the target CFByte value exceeds a predetermined threshold.

19. The non-transitory machine-readable storage medium of claim 18, wherein the lookup table stores piecewise linear approximations for a model of the memory component.

20. The non-transitory machine-readable storage medium of claim 17, wherein the operations further comprise determining a third CFByte value at the third voltage, wherein the using of the third voltage as the threshold voltage for the memory component is based on the third CFByte value and the target CFByte value.

* * * * *